United States Patent

[11] 3,590,898

| [72] | Inventor | Erling P. Toennesen |
| | | 102 Ruggles Ave., Newport, R.I. 02840 |
| [21] | Appl. No. | 827,678 |
| [22] | Filed | May 26, 1969 |
| [45] | Patented | July 6, 1971 |

[54] WHEEL AND TIRE HAVING HEMISPHERICAL SHAPE
9 Claims, 10 Drawing Figs.

[52] U.S. Cl. .................................................. 152/352
[51] Int. Cl. .................................................. B60c 3/00
[50] Field of Search.......................................... 152/352,
417, 330, 313, 342, 366, 349; 180/7; 301/5, 41

[56] References Cited
UNITED STATES PATENTS

| 1,939,096 | 12/1933 | Balfe | 152/366 |
| 2,395,383 | 2/1946 | White | 301/41 |
| 2,553,319 | 5/1957 | Hruska | 152/342 |
| 2,751,959 | 6/1956 | Blomquist | 152/416 |
| 2,931,414 | 4/1960 | Jonkowski | 152/417 |
| 2,998,996 | 9/1961 | Aghnides | 152/352 (X) |
| 3,001,601 | 9/1961 | Aghnides | 180/7 (X) |
| 3,038,517 | 6/1962 | McConkie | 152/349 |
| 3,112,785 | 12/1963 | Altorfer | 152/313 |
| 3,120,359 | 2/1964 | Sprecher | 244/102 (X) |

*Primary Examiner*—Milton Buchler
*Assistant Examiner*—Carl A. Rutledge
*Attorney*—Barlow and Barlow ABSTRACT: A hemispherical driving element for use with the mechanism shown in U.S. Pat. No. 3,364,874 and comprising a hemispherical rim with a hemispherical tire encasing the rim and means to attach the tire thereto, the tire being spaced from the rim by some cushioning means such as foam cells or air under pressure or both. A driving means is attached to the element and means are provided for moving the driving means and element from a position with its axis of rotation perpendicular to the surface engaged by the element to positions at angles to the perpendicular for driving the vehicle by contacting the tire along a circle spaced from the axis of rotation. Deflation of the tire may assist in more compactly housing the element in a recess in the fuselage of an airplane or the like.

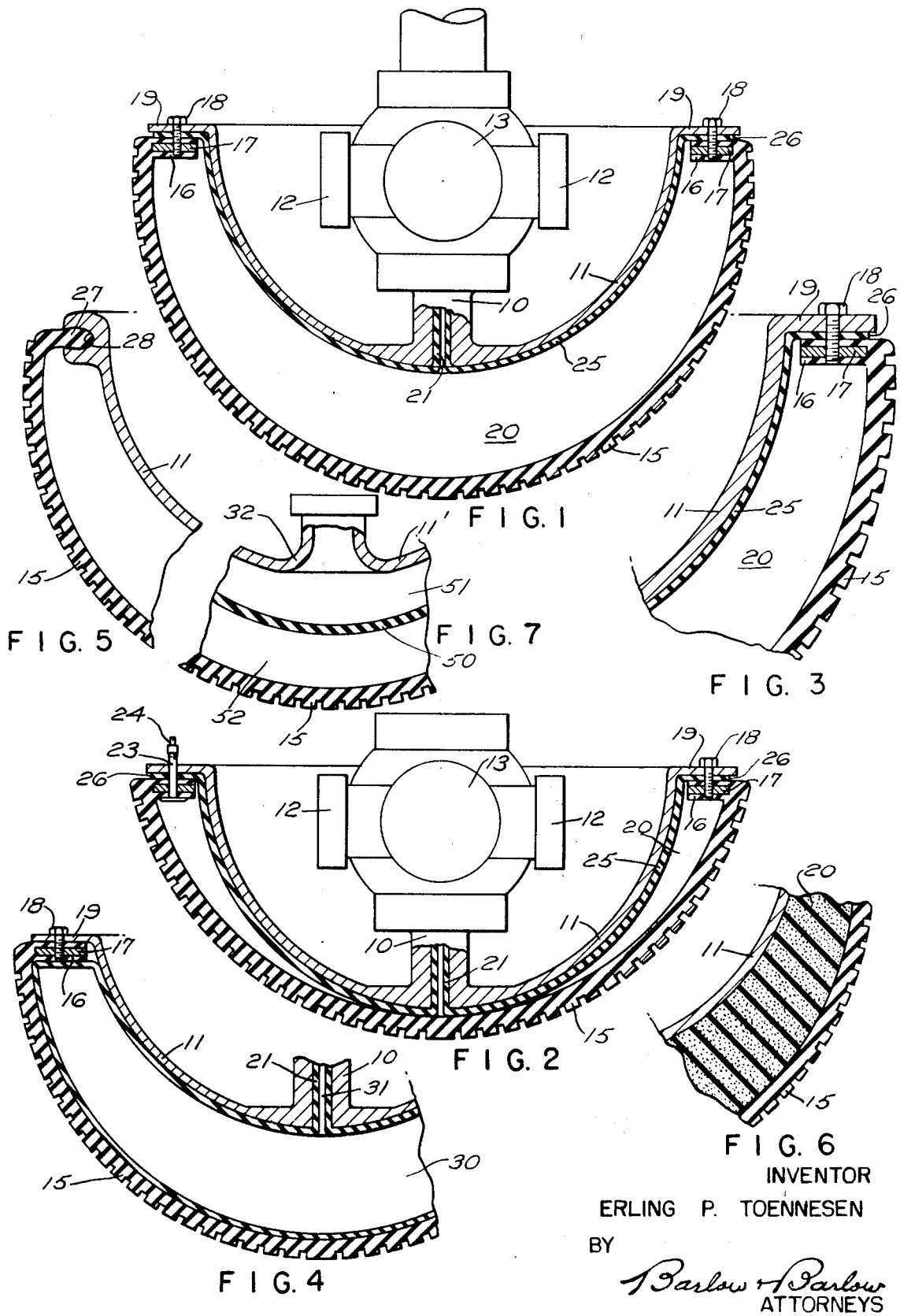

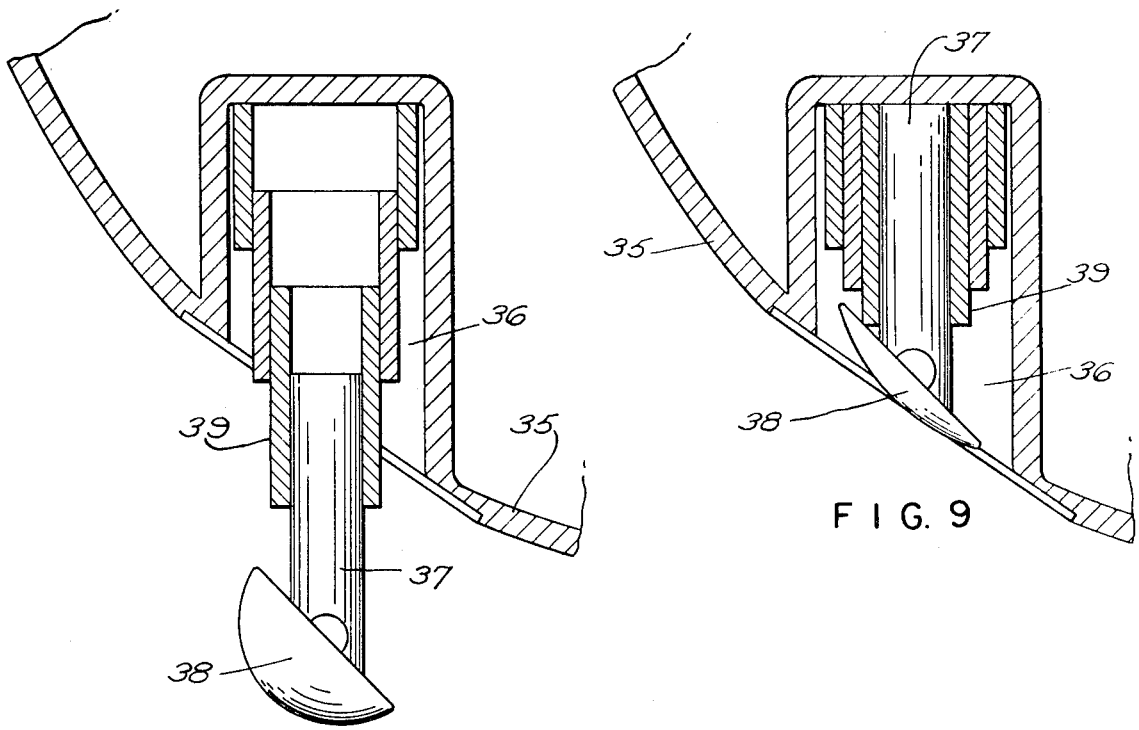
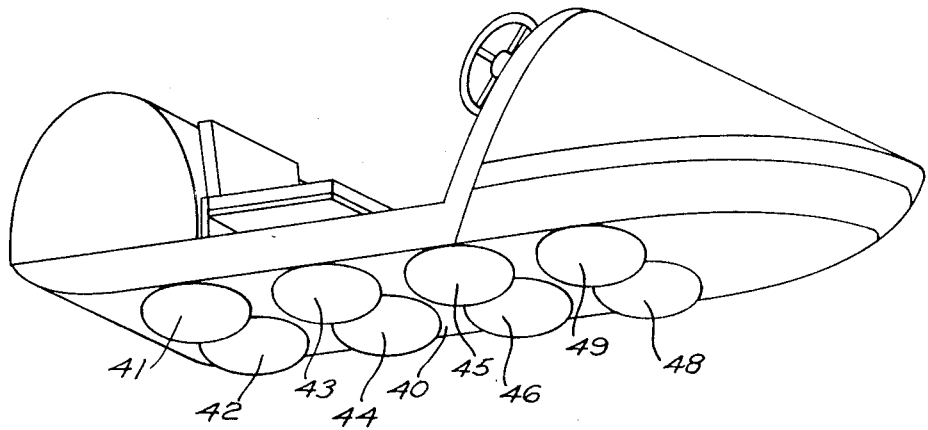

WHEEL AND TIRE HAVING HEMISPHERICAL SHAPE

BACKGROUND OF THE INVENTION

Driving a vehicle by changing the contact of a hemispherical wheel with a track or support for the vehicle is shown in my U.S. Pat. No. 3,364,874 but no tire was shown for this driving mechanism. In the use of this vehicle or driving mechanism in some other form than on a track, such as on a road or the like, where some other form of spherical wheel using a tire becomes desirable.

SUMMARY OF THE INVENTION

The driving mechanism, such as shown in my above-referred to patent, provides a hemispherical rim which in this application is encased with a similarly shaped resilient tire with a means to detachably secure the tire to the rim. The tire provides with the rim an enclosed chamber and the tire is supported spaced from the rim by some compressible means which may take the form of a resilient cushion material such as sponge rubber or foam cells or air alone or a combination of both and when air is used an inner tube may also be found desirable, or in some cases merely a lining over the rim. Inflation may be through the drive means attached to the rim which may also be deflated where air under pressure is used. The rim and tire may be tilted varying degrees as discussed in the above said patent for varying the speed of the vehicle which the wheel supports or drives.

BRIEF DESCRIPTION OF THE DRAWINGS

FIG. 1 is a sectional view illustrating a hemispherical rim and a hemispherical tire attached thereto and in inflated position;

FIG. 2 is a view similar to FIG. 1 showing the tire as deflated and against the rim;

FIG. 3 is a sectional view illustrating a slight modification in which there is provided a lining for the rim;

FIG. 4 is a sectional view illustrating an inner tube between the drive means and the tire;

FIG. 5 is a sectional view of a modification showing a portion of the tire vulcanized to the rim;

FIG. 6 is a sectional view similar to FIG. 1 illustrating foam cells between the rim and the tire;

FIG. 7 is a sectional view of a fragment showing a modified drive means;

FIG. 8 is a sectional view illustrating the wheel and structural member as projecting from the fuselage of a body such as an airplane;

FIG. 9 is a view similar to FIG. 7 showing the structural member and wheel retracted and the wheel deflated; and FIG. 10 is a perspective view looking at the underside of a vehicle equipped with the wheels of this invention.

DESCRIPTION OF THE PREFERRED EMBODIMENTS

With reference to the drawings 10 designated a driving means extending radially from a hemispherical rim 11 and universally supported in horizontal actuators 12 and vertical actuators 13, all of which is explained in greater detail in the patent above referred to.

A tire 15 is detachably mounted on this rim in any suitable manner and is here shown as being provided with inwardly extending flanges 16 having a metal nut 17 incorporated therein so that a screw 18 passing through the flange 19 of the rim 11 may snugly hold the tire in a position to encase the rim 11. Chamber 20 is provided between the rim 11 and the inner surface of the tire 15 which chamber may be inflated with air under pressure through the conduit 21 in the drive means 10. The control for this conduit is not illustrated but may include a valve at some remote location. In instances where the tire is desired to be deflated, the valve may be operated to permit such deflation. Additionally a manual air valve 23 and cap 24 may be provided in the rim (see FIG. 2) for inflation or deflation.

In FIG. 3 a lining 25 may be positioned over the rim 11 and will have a flange 26 to locate between the flange 16 and the flange 19 above described and will form a good seal to hold the air in the chamber 20. Deflating will permit the tire to move against the rim as shown in FIG. 2. In some cases instead of depending upon a seal between the flanges 16 and 19, an inner tube 30 (FIG. 4) may be utilized between the rim 11 and the tire 15 with a stem 31 to extend into the air inlet conduit 21 providing a good seal therewith.

In some cases the flange 27 of the tire (FIG. 5) may be vulcanized to a recess 28 in the rim edge forming a unit assembly for use.

In some cases instead of using an inner tube foam cells or sponge rubber (FIG. 6) may be placed within the chamber 20 and along with air under pressure utilized for supporting the tire in spaced relation to the rim.

In FIG. 7 the driving means is shown as a part, such as the casing 32, of a fluid motor or electric motor which casing is shaped to provide the hemispherical support 11' for the tire which will substitute as the conventional axle as previously shown. FIG. 7 also shows a multicell construction having a structural divider 50 between the outer casing 15 and structural member 11 providing an inner cell 51 and outer cell 52 to prevent complete deflation resulting from a fault to one cell.

In FIGS. 8 and 9 the fuselage 35 of a plane is shown provided with a recess 36 while the driving means here shown as a structural member 37 supporting a partially spherical wheel 38 is provided with a telescoping arrangement 39 permitting it to be retracted into the recess 36 as shown in FIG. 9 so that the wheel and its structural member are substantially housed in this recess. As retraction occurs, the air valve is opened so that the tire is deflated, thus causing it to project a minimum distance from the rim as shown in FIG. 9, FIG. 8 showing the tire inflated and fully expanded. A trip mechanism may be utilized so that when the structural member 37 is projected from the recess automatic inflation of the tire occurs.

In FIG. 10 a vehicle is shown at 40 having a plurality of wheels 41, 42 in the rear and other pairs 43, and 44, 45, 46, 47, 48 forward thereof which may be driven in a suitable manner and tilted so as to cause the vehicle to be immobile if the driving means intersects in a perpendicular line with the support for the vehicle or may be driven forward or back to either side by inclining the wheel so that a circular footprint instead of a center footprint contacts the ground as the wheels rotate.

The deflated tire 15 as shown in FIG. 2 may in some instances be constructed so as to have stretchable qualities in a more or less spherical direction to take the expanded shape as shown in FIG. 1.

Various applications may be had for wheels of this character for driving vehicles as desired.

I claim:

1. A driving wheel comprising an arcuate generally hemispherical supporting member, a normally vertical driving means on the center radius of said member, means for mounting said member to rock in all directions substantially about its hemispherical center, a similarly shaped tire encasing said member, and providing therewith an enclosed chamber, means to secure said tire to said member, and means in said chamber supporting said tire in generally radially spaced relation to said member along the line of said driving means to provide a cushion along the axis of said driving means.

2. A driving wheel as in claim 1 wherein said third said means provides for detachably securing said tire to said member.

3. A driving wheel as in claim 1 wherein the last said means is collapsible for permitting said tire to move toward said member.

4. A driving wheel as in claim 1 wherein the last said means comprises air under pressure.

5. A driving wheel as in claim 1 wherein the last said means comprises air under pressure and some resilient cushion material.

6. A driving wheel as in claim 1 wherein the last said means comprises an inner tube and air therein under pressure.

7. A driving wheel as in claim 1 wherein said supporting member is provided with a lining thereover.

8. A driving wheel as in claim 1 wherein the last said means comprises a multicell construction.

9. A driving wheel as in claim 1 wherein the last said means is collapsible and stretchable to provide a generally spherical shape.